US006682764B1

(12) United States Patent
Morris et al.

(10) Patent No.: US 6,682,764 B1
(45) Date of Patent: Jan. 27, 2004

(54) MICROWAVE BROWNING OF VEGETABLES

(75) Inventors: Stephen Morris, Thornleigh (AU); Barbara Stephens, Kings Langley (AU)

(73) Assignee: Commonwealth Scientific and Industrial Research Organization, Sydney (AU)

( * ) Notice: Subject to any disclaimer, the term of this patent is extended or adjusted under 35 U.S.C. 154(b) by 0 days.

(21) Appl. No.: 09/423,931
(22) PCT Filed: May 18, 1998
(86) PCT No.: PCT/AU98/00361
§ 371 (c)(1),
(2), (4) Date: Nov. 16, 1999
(87) PCT Pub. No.: WO98/52446
PCT Pub. Date: Nov. 26, 1998

(30) Foreign Application Priority Data

May 19, 1997 (AU) .............................................. P06871
Jan. 27, 1998 (AU) .............................................. PP1522

(51) Int. Cl.[7] .......................... A47J 27/00; B65D 81/34; A23L 1/025
(52) U.S. Cl. ...................... 426/243; 426/234; 426/268; 426/466; 426/637
(58) Field of Search ................................. 426/107, 234, 426/237, 241, 243, 102, 523, 395, 637, 403, 392, 466, 268; 219/729, 730, 734, 735

(56) References Cited

U.S. PATENT DOCUMENTS

| | | | | |
|---|---|---|---|---|
| 4,190,757 A | * | 2/1980 | Turpin et al. ......... | 219/10.55 E |
| 4,390,555 A | * | 6/1983 | Levinson ..................... | 426/234 |
| 4,448,791 A | * | 5/1984 | Fulde et al. .................. | 426/94 |
| 5,045,660 A | * | 9/1991 | Levinson ............. | 219/10.55 E |
| 5,057,331 A | * | 10/1991 | Levinson ..................... | 426/243 |
| 5,117,078 A | * | 5/1992 | Beckett ............... | 219/10.55 E |
| 5,227,599 A | * | 7/1993 | Mason et al. ......... | 219/10.55 E |
| 5,270,066 A | * | 12/1993 | Pawlowski .................. | 426/107 |
| 5,286,504 A | * | 2/1994 | Sheen et al. ................. | 426/243 |
| 5,387,781 A | * | 2/1995 | Berkoff ...................... | 219/735 |
| 5,519,195 A | * | 5/1996 | Keefer et al. ................ | 219/728 |

FOREIGN PATENT DOCUMENTS

| | | | | |
|---|---|---|---|---|
| EP | 0185488 | * | 6/1986 | ........... B65D/81/34 |
| GB | 2112257 A | * | 7/1983 | |
| GB | 2228662 A | * | 9/1990 | |
| JP | 02271808 A | * | 11/1990 | |
| JP | 02293533 A | * | 12/1990 | |
| JP | 404117528 A | * | 4/1992 | ................. 426/241 |
| JP | 0629968 | * | 5/1996 | |
| JP | 08131092 A | * | 5/1996 | |
| WO | WO 90/12506 | * | 11/1990 | |

* cited by examiner

Primary Examiner—Milton I. Cano
Assistant Examiner—Robert Madsen
(74) Attorney, Agent, or Firm—Welsh & Katz, Ltd.

(57) ABSTRACT

A method for the microwave irradiation of a vegetable to cook the same and to brown the exterior thereof includes the steps of applying a microwave activated browning agent to the surface of the vegetable; prior to irradiation, positioning a shielding material adjacent to the vegetable in a location such that, during irradiation, adjacent portions of the vegetable are shielded from microwave radiation; and irradiating the vegetable with microwave radiation to cook and brown the same.

13 Claims, 2 Drawing Sheets

MICROWAVE BROWNING OF VEGETABLES

This application is a 371 of PCT/AU98/00361, filed May 18, 1998.

FIELD OF THE INVENTION

The present invention relates to methods and apparatus which enable vegetables to be browned (e.g. to be provided with a golden brown and/or crisper skin) using microwave irradiation (e.g. in a conventional microwave oven). The invention will be described primarily with reference to its use with root vegetables (in particular potatoes), but it should be appreciated that the invention has broader application.

BACKGROUND ART

Very few attempts have been made to produce microwave-cooked vegetables with comparable skin colours and textures to those produced using a conventional radiant heat oven.

One technique employed to achieve such an effect uses a clear microwavable plastic wrap that is wrapped around the vegetable prior to irradiation. However, this technique does not simulate a comparable colour and crispness of exterior in the skin of such vegetables.

The Maillard reaction has been known to science since the 1940's. The Maillard reaction involves the action of amino acids and proteins on sugars. The reaction results in the formation of melanoidins, which are brown coloured nitrogenous polymers and co-polymers and give the requisite brown colour to food products coated with Maillard reaction components. The Maillard reaction can be activated by microwave irradiation. Various patents in the prior art make use of the Maillard reaction for browning foodstuffs, primarily, flour-containing foodstuffs such as pies, pastries etc, and meat products (see e.g. U.S. Pat. No. 5,089,278, JP08/131092, JP08/308531, U.S. Pat. No. 5,091,200 and GB2228662)

Other types of browning compositions have also been employed in the art, for example, the use of honey, the use of an aqueous syrup comprising a caramelised disaccharide (U.S. Pat. No. 4,252,832), the combination of salts such as potassium acetate, potassium chloride and sodium bicarbonate (U.S. Pat. No. 4,518,618) etc.

U.S. Pat. No. 5,043,173 discloses a browning agent for foodstuffs having a carbonyl-containing browning reactant. Again, this invention makes use of the Maillard reaction but instead of coating a foodstuff with a separate component, use is made of carbonyl functionality within the foodstuff itself. This document discloses that hash brown potatoes can provide the requisite carbonyl functionality, (hash browns being a reconstituted form of potato).

As an alternative to the employment of browning compositions, use has been made in the prior art of microwave "susceptor" materials to achieve browning (i.e. such materials typically being incorporated into containers that surround the food products to be browned). A microwave susceptor material is a microwave-interactive material which converts microwave energy into thermal energy (thereby browning adjacent foodstuffs by convection and radiant heating). Various prior art documents define microwave susceptor materials, including WO91/11893, AU14584/88, AU14998/92, U.S. Pat. No. 4,555,605, U.S. Pat. No. 4,590,349, U.S. Pat. No. 4,594,492, U.S. Pat. No. 4,190,757, U.S. Pat. No. 4,626,641 and U.S. Ser. No. 11377/95. Susceptor materials are typically formed from dielectric materials and can be, for example, an alloy of metals which contains both electrically conductive and magnetic materials.

EP303511 discloses the use of a microwave interactive (susceptor) material for browning dough-type products. It also discloses the use of a Maillard reaction for browning a base of the dough product.

The prior art also discloses various types of microwave shielding materials which are employed in containers and enable an even microwave cooking of foodstuffs located in those containers. Examples of various types of shielding arrangements are shown in EP185488, U.S. Pat. No. 4,345,133, AU47100/89, U.S. Pat. No. 4,233,325, GB2307159, WO92/13432, U.S. Pat. No. 4,626,641 etc.

The microwave browning of vegetables, however, presents special problems. This problem in part stems from the geometry of vegetables, for example root vegetables, wherein these geometries make an even cooking and browning difficult (i.e. The vegetable is not a homogeneous product as is the case with prior art dough-type products etc). Furthermore, for the microwave cooking of whole vegetables the art has actually taught away from the use of a Maillard reaction (i.e. Maillard reactions have been avoided in the microwave cooking of vegetables). This is because a vegetable needs to be, in a sense, overcooked in a microwave oven to achieve cooking therethroughout, and if a Maillard composition were to be present on the exterior of a vegetable, then this would lead to blackening at the high irradiation/cooking rate.

It would be advantageous to provide a technique whereby microwave irradiation, more particularly microwave cooking, of a vegetable simulates the appearance and texture of the vegetable as cooked (e.g. baked) in a conventional radiant heat oven. Such a technique could then take advantage of the fast cooking times and convenience associated with microwave ovens.

SUMMARY OF THE INVENTION

In a first aspect the present invention provides a method for the microwave irradiation of a vegetable to cook the same and to brown the exterior thereof including the steps of:
  (i) applying a microwave activated browning agent to the surface of the vegetable;
  (ii) prior to irradiation, positioning a shielding means adjacent to the vegetable in a location such that, during irradiation, adjacent portions of the vegetable are shielded from microwave radiation; and
  (iii) irradiating the vegetable with microwave radiation to cook and brown the same.

Such a method enables the vegetable to be subjected to controlled microwave cooking, whilst at the same time browning can occur, and microwave intensity can be applied without the risk of an overcooked region developing (i.e. being prevented by the shielding means).

Preferably the browning agent is a Maillard composition. For example, any of the Maillard compositions as defined in the prior art can be employed.

Typically the shielding means is an absorptive and/or reflective material, and in preferred forms in provided in a container housing the vegetable in the form of a strip of material.

Instead of employing Maillard components, other types of browning agents can be used, such as those described above, or colourants dispersed in continuous edible fats or oils (see e.g. U.S. Pat. No. 5,139,800).

The present invention in a second aspect provides a method for the microwave irradiation of an unskinned vegetable to brown the skin thereof including the steps of applying a sugar and an amino acid to the skin and then subjecting the vegetable to microwave radiation for a predetermined period of time.

Thus, an unskinned vegetable (e.g. a whole potato) having, in some way, a sugar and an amino acid located at the exterior thereof, and when irradiated with microwave radiation, can have visual and textural effects imparted to the skin of the vegetable that simulate those that occur using conventional radiant heat. A major part of the browning typically occurs as a result of the sugar reacting with the amino acid, and shielding can be used to achieve both even cooking and even browning.

When the term "vegetable" is used in the present specification, it is primarily a reference to root vegetables such as potatoes, onions, carrots, sweet potatoes, pumpkin, etc, but it should be appreciated that the term is not so limited and may also extend to some types of fruit (e.g. tomatoes).

In addition to the sugar and amino acid, a salt can typically by applied to the vegetable exterior (usually as a mixture with the sugar and amino acid). A typical salt employed is sodium nitrite but sodium chloride, sodium acetate and sodium carbonate are suitable alternatives. More typically the salt is applied as part of the solution applied to the vegetable. The inclusion of a salt with dielectric absorption qualities helps to speed up the browning process. The salt also tends to counteract any sweetness from the sugar and tends to assist in the longer term storage of the so coated vegetable by slowing down microbial growth.

Preferably in the first aspect the vegetable is unskinned, and more typically a so-called "whole vegetable" (e.g. a whole potato) is employed.

In one alternative the sugar, amino acid and the salt are applied as a solution to the vegetable such as an aqueous-based solution. The solution can be sprayed on or applied by dipping followed by drying (e.g. with warm air), prior to the vegetable being subjected to microwave irradiation. Optionally the application of a food grade lipid or edible surfactant prior to coating with the sugar and amino acid, or between these two compounds, can be employed. Maillard components can also be arranged on/delivered to the vegetable exterior (e.g. powders, liposome delivery systems, edible surfactants etc). Examples of edible surfactants include vegetable gums (e.g. guar gum, locust bean gum), hydrogenated oils (e.g. cotton seed, soy bean, palm oils), natural or pregelatinised starches (e.g. wheat, corn, barley) and fatty acid esters of glycerol.

Typically the sugar is selected from one or more of ribose, xylose or glucose (i.e. a sugar that will react with the amino acid). Ribose performs best in the browning process but xylose and glucose are more readily available and less expensive than ribose. Typically the amino acid is glycine, alanine or any other amino acid that reacts with the sugar, or can be a mixture of amino acids contained in hydrolysed protein. Again, sugars and amino acids as employed in the prior art can also be employed.

A most preferred application of the invention is in relation to whole potatoes. With large potatoes (e.g. 200–250 g), the predetermined microwave radiation time is typically 4–6 minutes. The methods can be operated so that browning commences after approximately 4 to 5 minutes and at temperatures in excess of 100° C. (e.g. at about 130° C.). Typically a cooking time that is about one minute longer than the minimum required to internally cook the vegetable is employed to produce crispiness of the vegetable skin.

The shielding means is employed because when vegetables are browned using such methods and in particular potatoes, it has been observed that an overcooked region (a so-called "soggy band") occurs horizontally around the equator of the vegetable. Accordingly, it is preferred that during microwave irradiation, the shielding means is arranged at the region of the vegetable where overcooking is likely to occur (e.g. at the generally horizontal equatorial region of the vegetable). This prevents excess microwave radiation from reaching this region. Typically the shielding means is a strip of microwave reflective or absorptive material such as aluminum, carbon black, or a conductive paint or ink. However, various shielding materials as disclosed in the art can also be employed.

The invention also extends to an unskinned vegetable when coated with a coating that includes a sugar and an amino acid.

In a further aspect, the invention relates to a container for enabling the microwave browning of a vegetable exterior when the vegetable is enclosed therein, the container in part allowing the throughput of microwave radiation in a manner that enables the browning of the vegetable exterior adjacent to that part to occur, and incorporating in another part a shielding means which shields from microwave radiation, at least to some extent, the vegetable exterior adjacent to that other part.

Such a container can enable vegetables that are coated with sugar and amino acid (or other browning agents) to be evenly browned under microwave irradiation (i.e. The microwave shielding enables even cooking and browning of the vegetable). Such containers can also enhance the transport and storage of vegetables enclosed therein.

Preferably the container is vented to enable water vaporised from the vegetable during microwave irradiation to be released therefrom and to permit the free movement of air past the vegetable during irradiation. The vents are typically vertically extending slits that are evenly spaced around the top and bottom of the container, the slit width usually being e.g. 2 mm or greater. The amount of surface area of the container that is vented is typically 1.5% to 2% of the total external surface area of the container.

The interior of the container is preferably approximately the same shape as the vegetable when enclosed therein. Accordingly, the shielding means can be positioned adjacent to the region likely to be overcooked in use (e.g. the generally horizontal equatorial region of the vegetable).

Typically, the container is in two parts, having a top half and a bottom half and the top half is typically connectable/connected (e.g. hinged) to the bottom half. The shielding means can then be a strip positioned circumferentially on and adjacent to the top of the container bottom half, for example.

Typically, the container is formed from a microwavable structurally stable plastic such as clear or translucent polyester, polypropylene or polycarbonate.

In a further aspect the invention relates to a method for preventing the formation of an overcooked region in an unskinned vegetable during microwave radiation thereof, including the step of positioning a microwave shielding means adjacent to the region, the shielding means being adapted for reflecting and/or absorbing incident microwave radiation to prevent excess radiation from reaching the region.

Typically, the overcooked region is located equatorially (and horizontally) around the vegetable.

Again, the shielding means can be as defined above. This latter method is typically incorporated as part of the method of the first and second aspects of the invention and/or with a container according to the further aspect of the invention as defined above.

BRIEF DESCRIPTION OF THE DRAWINGS

Notwithstanding any other forms which may fall within the scope of the present invention, preferred forms of the invention will now be described, by way of example only, with reference to various non-limiting examples and with reference to FIGS. 1 and 2 of the accompanying drawings which each show a side perspective view of one type of container according to the invention but in open and closed configurations respectively.

MODES FOR CARRYING OUT THE INVENTION

Figure 1:
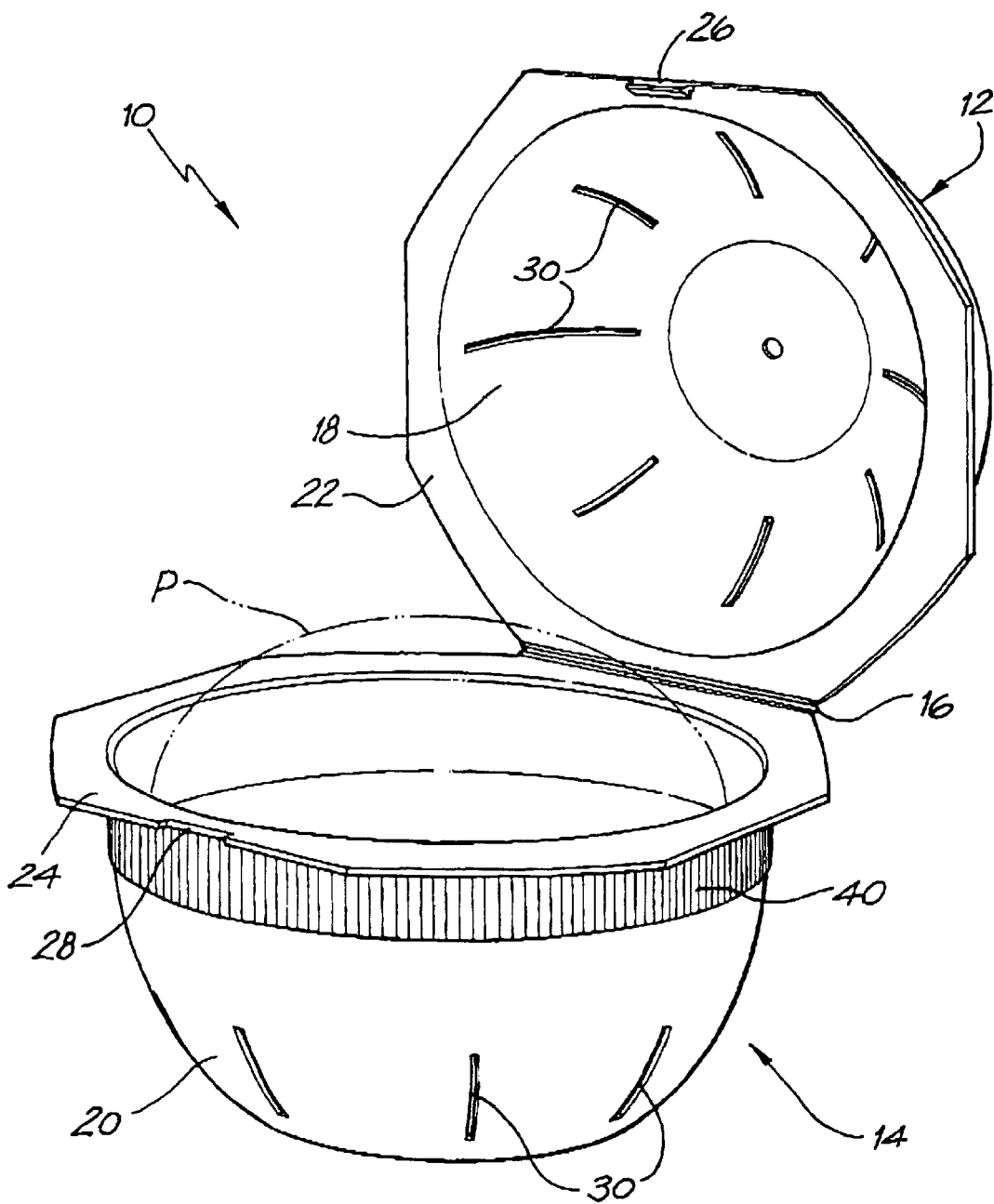
Figure 2:
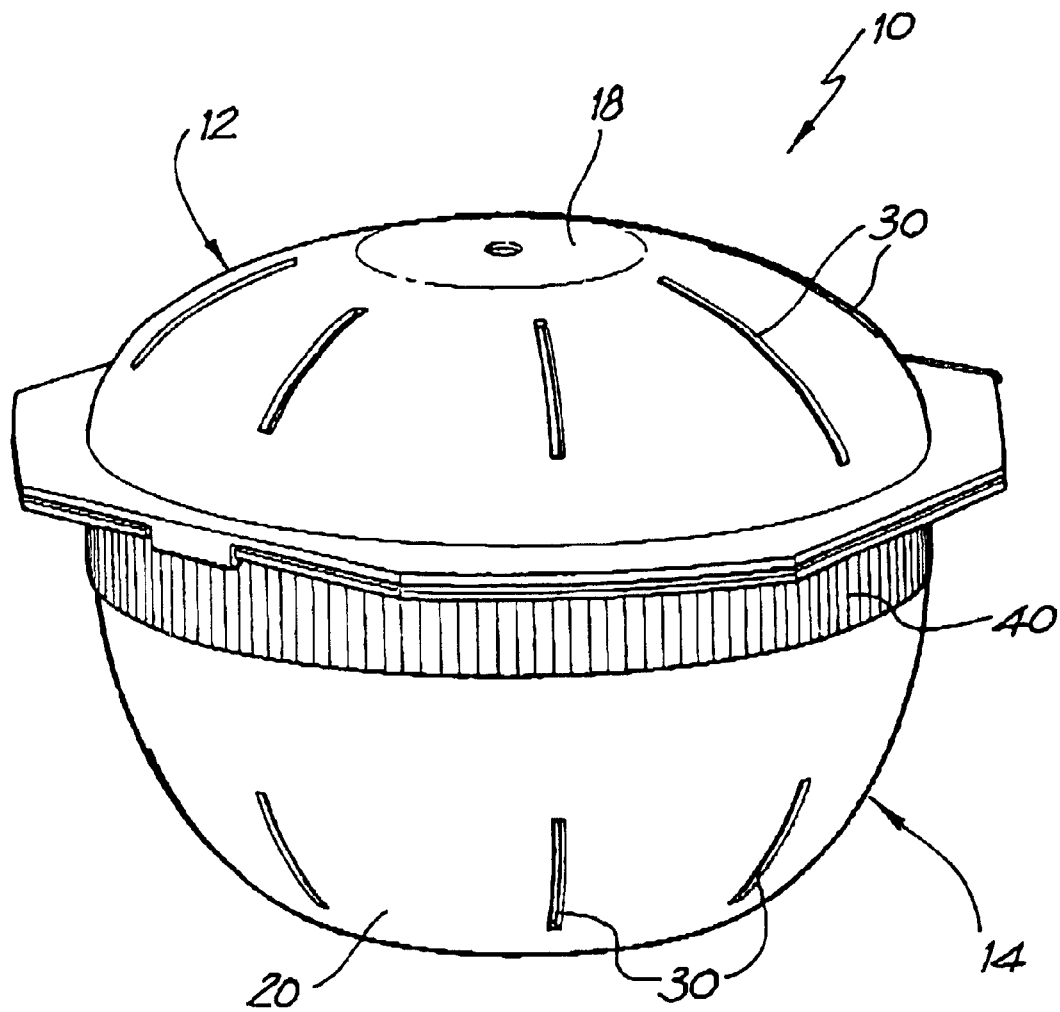

Referring to FIGS. 1 and 2, a container that enables the microwave irradiation of a vegetable is shown in the form of a punnet 10. The punnet includes a top half 12, which is about half the height of a bottom half 14. The top and bottom halves are hinged together at hinge 16. Both the top and bottom halves include half domes 18 and 20 respectively so that a vegetable (e.g. a potato P) can be positioned and enclosed in the container.

The container is closed (FIG. 2) when the top half circumferential flange 22 is brought into abutment (or close facing relationship) with a corresponding circumferential flange 24 on the bottom half (e.g. as facilitated by pivoting about the hinge 16). A lip 26 extending from the top flange can be provided and can be received in a catch 28 (FIG. 1) extending from the bottom flange to lock the respective flanges together and prevent pivotal opening of the container (about hinge 16). Alternatively, a clip-lock can be employed.

The top and bottom halves are provided with a number of evenly spaced vertical perforations (slits) 30 therethrough, which enables the release of vaporised water (e.g. steam) from the container when the vegetable enclosed therein is subjected to microwave irradiation (e.g. cooking). The perforations also permit the free movement of air past the vegetable during irradiation.

Typically, the underside of the bottom half has a flat portion for placement on a microwave tray in a microwave oven and for ease of storage and transportation of the containers (i.e. when each carries a vegetable therein).

Furthermore, the containers can be of varying shapes and sizes to suit the vegetable to be enclosed therein and standard container sizes for standard vegetable sizes (e.g. standard potato sizes) can be provided.

Typically, the container is formed from a clear or translucent polyester, polyproplene or polycarbonate.

Extending circumferentially around the container bottom half is a band (or strip) of microwave absorptive and/or reflective material 40. Typically, the material employed is an aluminium strip arranged around the exterior of the bottom half. Also, carbon black (optionally with aluminium combined therewith) or conductive paints or inks can be printed on the container as the strip material. When the vegetable is positioned in the container as shown, the strip aligns generally with a horizontal equatorial region of the vegetable (and optionally with any region that might overcook). The strip thus shields the region from microwave radiation during cooking (i.e. shields the surface of the vegetable adjacent to the strip). This prevents the formation of the so-called "soggy" band (or overcooked region).

EXAMPLE 1

An aqueous solution comprising 0.3 moles concentration of a sugar (xylose 4.6%), 0.3 moles of an amino acid (glycine 2.3%) and 0.3 moles of a salt (sodium chloride 2.2%) was prepared. A whole potato (e.g. Sebago variety, weighing about 200 g) was dipped in this solution for 5 seconds, or alternatively the whole potato was sprayed with the solution. The potato was then air dried.

The potato in the above described container was placed in the centre of a domestic 750 watt microwave oven and was cooked on high power for 5 minutes.

Various sugars were tested, individually and in combination thereof, including ribose, xylose, glucose and/or sucrose. Each sugar was tested with the amino acid glycine, but the amino acid alanine was observed to work best of the various amino acids. However, alanine although about twice as effective as glycine in the browning process did not produce as attractive a colour as glycine. Other amino acids tested included valine, aspartic acid and glutamic acid.

The salts of sodium nitrate, sodium chloride, sodium acetate and sodium carbonate were found to augment the browning and assist in preserving microbiological health when included in the coating solutions at levels ranging from about 1 to 5%.

Typical concentrations of the sugars and amino acids are shown in the following table.

| Sugar | Amino Acid | Conc, (M*) for Light Gold Colour | Conc, (M) for Light Brown Colour |
|---|---|---|---|
| Ribose | Glycine | 0.1 | 0.15 |
| Xylose | Glycine | 0.2 | 0.3 |
| Glucose | Glycine | 0.3 | 0.4 |
| Xylose | Alanine | 0.15 | 0.2 |
| Glucose | Alanine | 0.2 | 0.3 |
| Xylose | Valine | 0.5 | 0.7 |

*Equal molarity of sugar and amino acid were used.
One Mole of ribose = 15.0% solution (w/v); of xylose = 15.0%; of glucose = 18.0%; of glycine = 7.5%; of alanine = 8.9% and of valine = 11.7%.

During microwave cooking the potato was generally observed to lose 15–20% of its weight; (this also occurs with the oven-baking of potatoes). To obtain crispness of skin, it was observed to be important to microwave cook the potato until the skin was slightly detached from the underlying flesh. This typically required a minute longer than the minimum to cook the potato. A longer cooking time increased browning as desired.

The procedure was also conducted whereby the potato was microwaved for an initial period (e.g. 5 minutes) and final browning was conducted in a conventional radiant heat oven.

In all cases, satisfactory levels of browning and crispness were achieved whilst the cooking time of the potato was substantially reduced.

EXAMPLE 2

A commercial implementation of Example 1 included the following steps:
1. The vegetables (e.g. Sebago potatoes) were selected so as to fall within a certain size range.
2. The vegetable was washed in an aqueous solution containing dissolved chlorine to sterlise the same and kill any bacteria therein.
3. The vegetable was then punctured with a sterile needle to just break the skin (and to enhance water release during microwave cooking thereof).

4. The vegetable was briefly washed again in a sterile solution to sterlise the punctured areas.
5. The vegetable was warm air blown until dried in a suitable oven.
6. The vegetable was then dipped in a solution containing a sugar, an amino acid and a salt (e.g. as per Example 1).
7. The vegetable was then warm air dried and placed in a punnet (as depicted in FIG. 1). The punnet was closed and then optionally stored.

After such treatment and storage, the vegetable was observed to be suitable for reasonably long term storage and/or transportation. When required for use, the punnet as a whole was placed in a microwave oven and irradiated, (e.g. as per Example 1).

In the case of potatoes, when removed from the punnet after microwave cooking, the potato was observed to have a crisp golden brown skin similar to that achieved with radiant heat potato baking.

Whilst the invention has been described with reference to a number of preferred embodiments, it should be appreciated that the invention can be embodied in many other forms.

What is claimed is:

1. A method for the microwave irradiation of an unskinned whole vegetable to cook the same and to evenly brown the exterior thereof including the steps of:
   (i) applying a microwave activatable browning agent to the exterior of the unskinned whole vegetable;
   (ii) placing the unskinned vegetable inside a container having opposing halves, each half having a plurality of openings to allow the passage of steam from the container, the container having a band of shielding material about said unskinned vegetable and integral with the container about an equatorial horizontal portion of said container, said shielding material being selected from the group consisting of carbon black, conductive paint and conductive ink;
   (iii) said band thereby shielding the microwave activatable browning agent in a horizontal equatorial region of said vegetable from microwave irradiation to prevent overcooking of said vegetable in the equatorial region; and then
   (iv) irradiating the vegetable with microwave radiation sufficiently to cook the vegetable and evenly brown the exterior thereof.

2. A method as claimed in claim 1 wherein the browning agent is a composition including a sugar and an amino acid.

3. A method as claimed in claim 2 wherein, in addition to the sugar and the amino acid, salt is applied to the vegetable exterior.

4. A method as claimed in claim 3 wherein the sugar, the amino acid and the salt are applied as a solution to the vegetable exterior.

5. A method as claimed in claim 3 wherein the salt is sodium nitrite, sodium chloride, sodium acetate and/or sodium carbonate.

6. A method as claimed in claim 4 wherein the solution is aqueous-based and the vegetable is sprayed with or dipped in the solution and is then dried prior to being subjected to the microwave radiation.

7. A method as claimed in claim 6 wherein the vegetable is dried with warm air.

8. A method as claimed in claim 2 wherein the sugar is selected from one or more of ribose, xylose or glucose, and the amino acid is glycine or alanine.

9. A method as claimed in claim 1 wherein the vegetable is a root vegetable.

10. A method as claimed in claim 9 wherein the root vegetable is a potato.

11. A method as claimed in claim 10 wherein for a 200–250 g whole potato the potato is cooked for a predetermined time of approximately 4–6 minutes.

12. A method as claimed in claim 11 that is operated so that the browning occurs after approximately 4 to 5 minutes and at a temperature in excess of 100° C.

13. A method as claimed in claim 12 wherein the temperature is about 130° C.

* * * * *